May 25, 1954     H. G. CRAM     2,679,193
DISK SCREEN
Filed Jan. 13, 1949     6 Sheets-Sheet 1

INVENTOR
HERVEY G. CRAM
BY
ATTORNEYS

May 25, 1954  H. G. CRAM  2,679,193
DISK SCREEN
Filed Jan. 13, 1949  6 Sheets-Sheet 2

INVENTOR
HERVEY G. CRAM
BY
ATTORNEYS

May 25, 1954

H. G. CRAM 2,679,193

DISK SCREEN

Filed Jan. 13, 1949

INVENTOR
HERVEY G. CRAM

BY

ATTORNEYS

INVENTOR
HERVEY G. CRAM

ATTORNEYS

May 25, 1954  H. G. CRAM  2,679,193

DISK SCREEN

Filed Jan. 13, 1949  6 Sheets-Sheet 5

INVENTOR
HERVEY G. CRAM

BY

ATTORNEYS

May 25, 1954 H. G. CRAM 2,679,193
DISK SCREEN
Filed Jan. 13, 1949 6 Sheets-Sheet 6
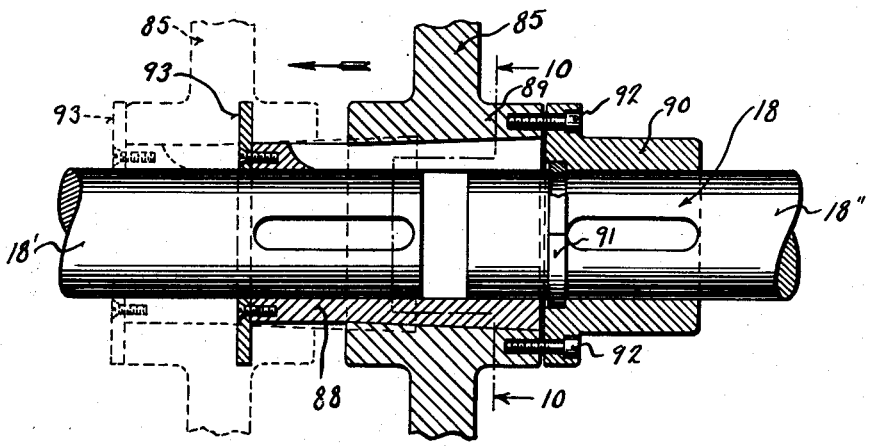
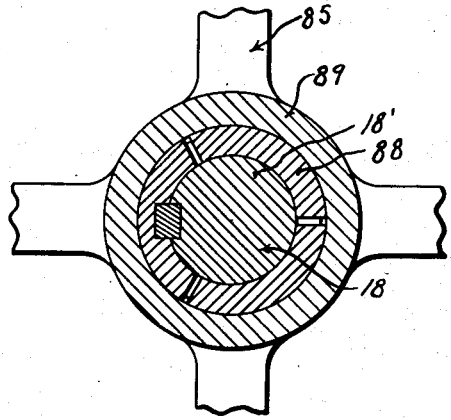
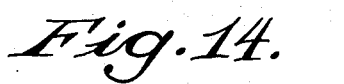
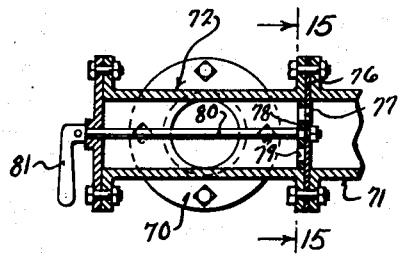
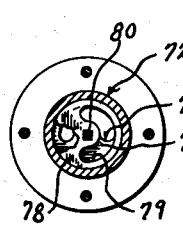
INVENTOR
HERVEY G. CRAM
BY
ATTORNEYS Patented May 25, 1954

2,679,193

UNITED STATES PATENT OFFICE 2,679,193

DISK SCREEN

Hervey G. Cram, Appleton, Wis., assignor to Combined Locks Paper Co., Combined Locks, Wis.

Application January 13, 1949, Serial No. 70,648

4 Claims. (Cl. 92—34)

This invention appertains to pulp, paper stock and like screening machines of the disc type and is an improvement over my Patent No. 2,480,119, issued to me August 30, 1949.

One of the primary objects of my present invention is to provide a novel type of disc screen or plate for the pulp screening machine, so that a relatively large area of screen surface will be had in machines of a small, compact order and whereby the pulp to be screened will be moved rapidly over the entire area of screen surface both radially and circumferentially to increase the effective screenability of the machine.

Another salient object of my invention is the provision of a substantially concavo-convex or dished screen plate with runners on the opposite sides of the plate conforming to the radial inclination of the plate, with means for introducing a uniform head of unscreened pulp around the axis of the plate, the shape of the screen plate and the runners insuring a uniform suspension of solids in the pulp mixture and the direction of the pulp uniformly over the entire area of the screen plate, means being provided however, for introducing white water adjacent to the periphery of the screen for reducing the consistency of the stock.

A further object of the invention is the provision of novel means for forming the casing and the frame for the screen plate, so that an internal, annular chamber will be provided around the entire periphery of the screen plate for the reception of the rejected material, so that such rejected material can be quickly led to the desired outlet, means being provided for increasing the flow of such material through the outlet by the use of an inlet white water conduit.

Another further object of the invention is the provision of novel means for controlling the flow of rejected material and for flushing out the rejection piping when necessary.

Another further object of the invention is to provide novel means for driving a pair of screening machines in tandem and novel means for forming the common drive shaft therefor, whereby the drive belts for the common drive pulley can be quickly and easily placed in position on said pulley.

A still further object of the invention is to provide novel means for forming the casing and associate parts, whereby such casing can be quickly taken apart to expose the interior of the screen and thereby permit the easy removal of the runners and screen frames and plates.

With these and other objects in view, the invention consists in the novel construction, arrangement and formation of parts as will be hereinafter more specifically described and claimed, and illustrated in the accompanying drawings, in which drawings, Figure 1 is a side elevational view showing my novel screening machines in tandem.

Figure 9 is an enlarged detail longitudinal sectional view illustrating the novel construction of the common drive shaft for permitting the placing of the pulley belts on the pulley wheel.

Figure 10 is a detail transverse sectional view through the drive shaft and associate parts taken on the line 10—10 of Figure 9 looking in the direction of the arrows.

Figure 11 is an enlarged fragmentary detail sectional view through the screen plate and an up stream runner blade, the section being taken on the line 11—11 of Figure 8, the view illustrating diagrammatically the action of the pulp through the screen under influence of the up stream runner blade.

Figure 12 is a similar sectional view taken through the screen plate and a down stream runner blade, the section being taken on the line 12—12 of Figure 8, the view illustrating diagrammatically the flow of pulp through the screen plate under the action of said down stream runner blade.

Figure 13 is a fragmentary detail diametric sectional view through the screen plate, illustrating the formation of the screen openings therein.

Figure 14 is a detail longitudinal sectional view through one of the control valves for the rejected material, the section being taken substantially on the line 14—14 of Figure 3, looking in the direction of the arrows.

Figure 15 is a detail transverse sectional view through the valve taken on the line 15—15 of Figure 14 looking in the direction of the arrows.

Figure 1:
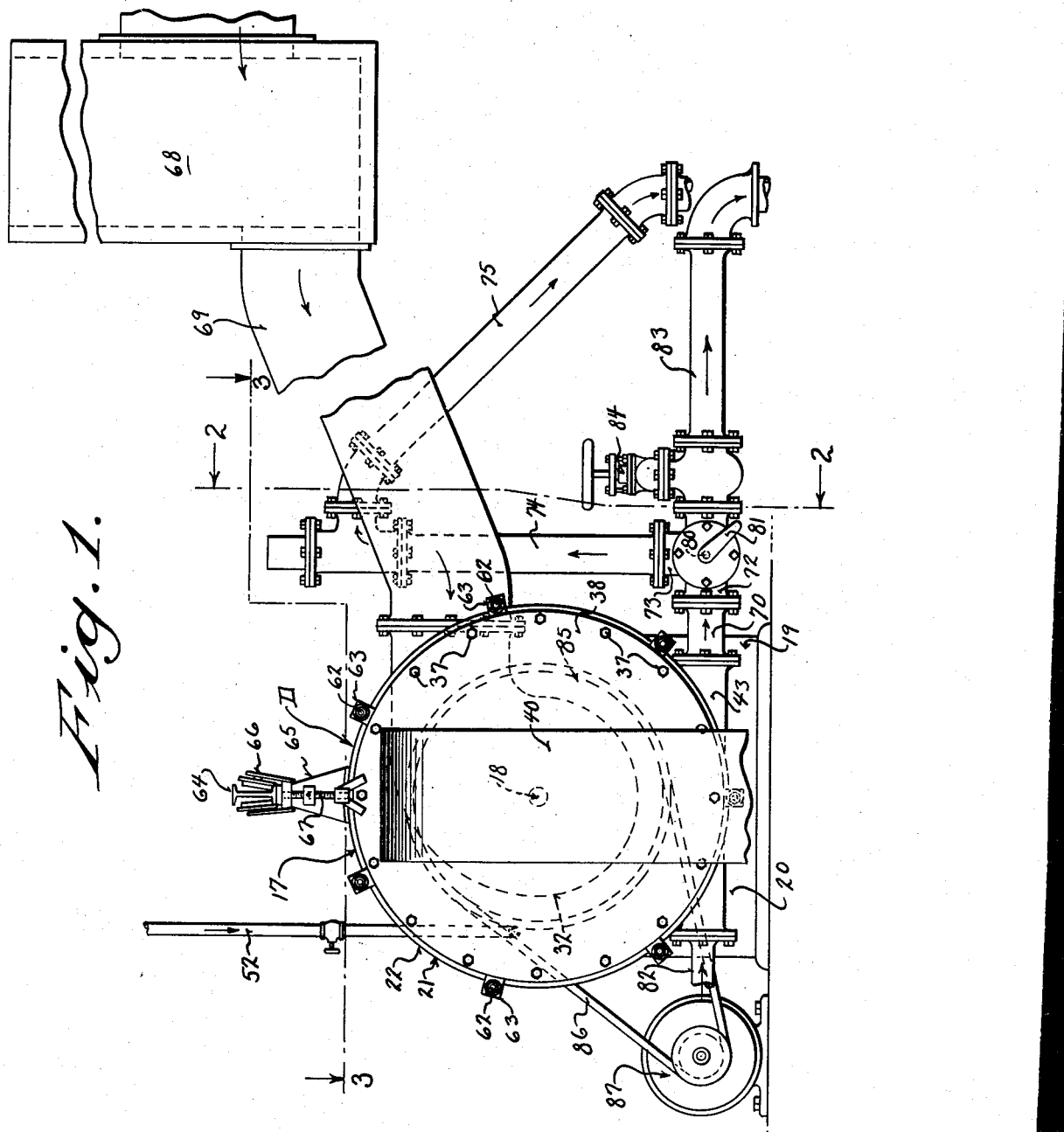
Figure 2:
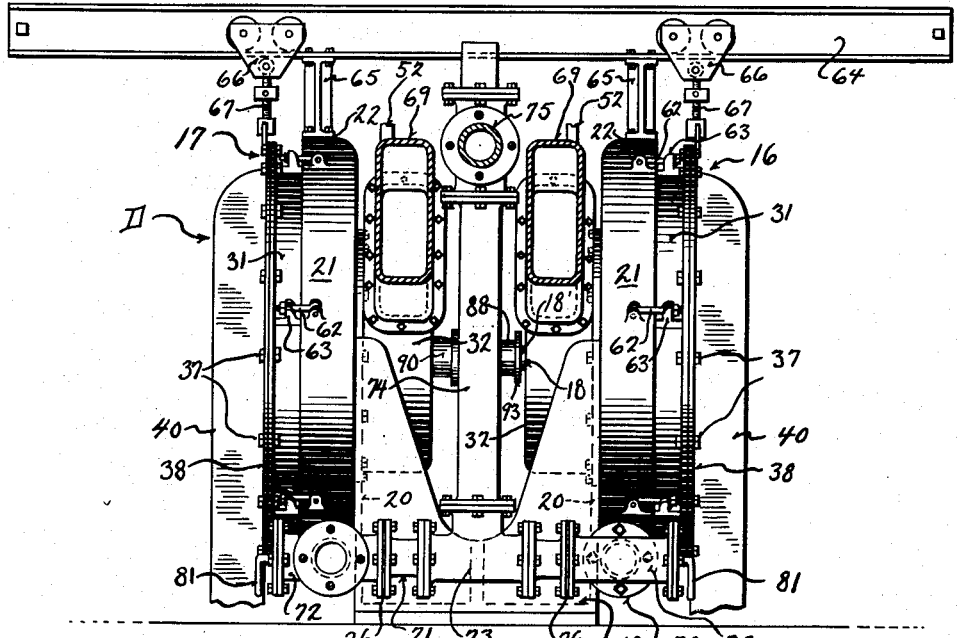
Figure 2 is a vertical sectional view taken on the line 2—2 of Figure 1, looking in the direction of the arrows, the view showing the screening machines in tandem and in rear elevation.
Figure 3:
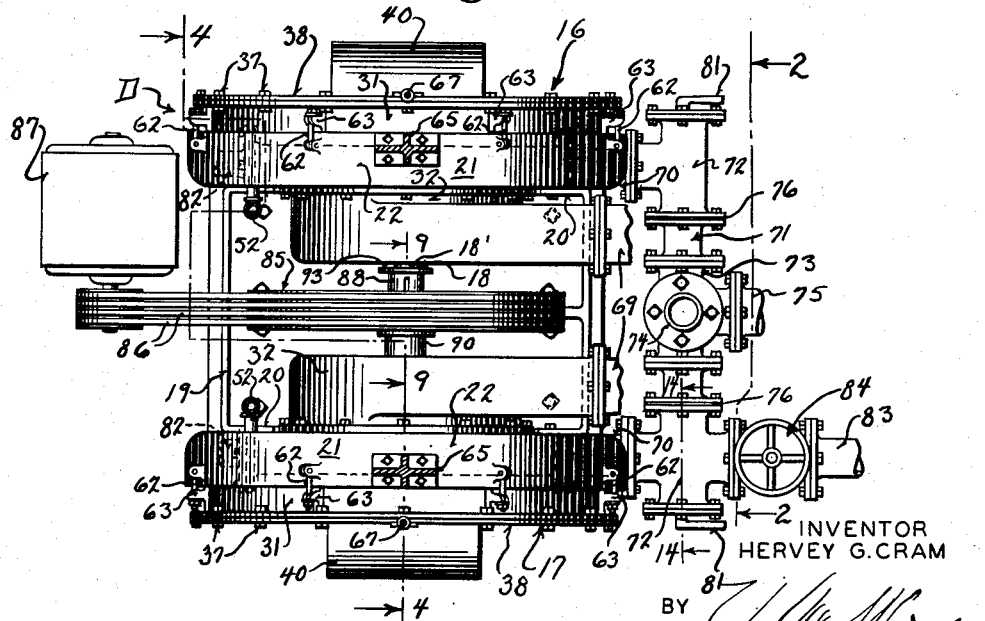
Figure 3 is a horizontal sectional view taken on the line 3—3 of Figure 1, looking in the direction of the arrows, the view showing the pair of screening machines in top plan.

Referring to the drawings in detail, wherein similar reference characters designate corresponding parts throughout the several views, the letter D generally indicates my improved disc screen and the same includes a pair of identical screening machines 16 and 17 arranged in tandem operated from a common drive shaft 18, which will be later described in detail.

The disc screen D includes a common supporting base 19 for the tandem machines 16 and 17, and this base frame includes like side plates 20 to which are firmly and rigidly secured certain parts of the screening machines 16 and 17.

As the machines 16 and 17 are identical in construction, a description of one will suffice for both. Each of the machines includes a substantially annular casing 21 and the casing embodies an annular outer wall 22 and an inner flat side wall 23. This wall 23 is provided around its axial center with a series of inlet ports 24 for unscreened pulp. The outer wall 22 is provided with an interior annular flange 25 which forms a seat for the outstanding flange 26 of the screen frame 27. The frame 27 can be in the nature of a casting and takes the form of a spider and can include an outer rim 28 on which the flange 26 is formed, and radial supporting ribs or arms 29 carried by a hub 30.

The screen frame 27 is firmly secured to the casing 21 by a clamping ring 31.

Arranged on the inner face of the casing 21 is the inlet housing 32 for the unscreened pulp and this housing is provided with a series of outlet openings 33 communicating with the ports 24 in the casing 21. The inlet housing 32 is of a substantially annular form and includes an inner sleeve wall 34 which surrounds the drive shaft 18 and certain associate parts. The axial center of the casing 21 can carry suitable bearings for the shaft 18 and any desired packing glands.

Attention is now directed to the frame 27 and it is to be noted that the frame is dished inwardly toward its axial center and forms a support for the screen plate 35. The screen plate 35 is dished inwardly toward its axial center and takes substantially the form of a cone or concave-convex disc. For the purpose of ease of assembly and economical manufacture, the disc is formed in four like quarter segments and these segments are securely fastened to the frame by attaching screws 36. Each of the segments consists of a metal plate with a plurality of spaced perforations punched or otherwise cut through the plate. Stress is laid on the shape and contour of the plate 35 in that certain vital advantages are obtained by the use of a dished screen plate. Not only is the active area of the disc increased for its circumference, but the flow or pulp over the screen is aided. It is to be noted that the screen plate is dished inwardly on the up stream side and the unscreened pulp initially flows toward the dished face of the screen. Hence as the pulp moves radially outwardly as hereinafter described it will have an uphill or upstream travel tending to retard its progress thus increasing the intensity of the screening action and the capacity of the screen.

Securely fastened to the clamping ring 31 by cap screws 37 is a closure plate 38 having an outlet opening 39 for screened stock adjacent to its extreme upper end and the closure plate carries discharge spout 40 for the screened stock.

Figure 4:
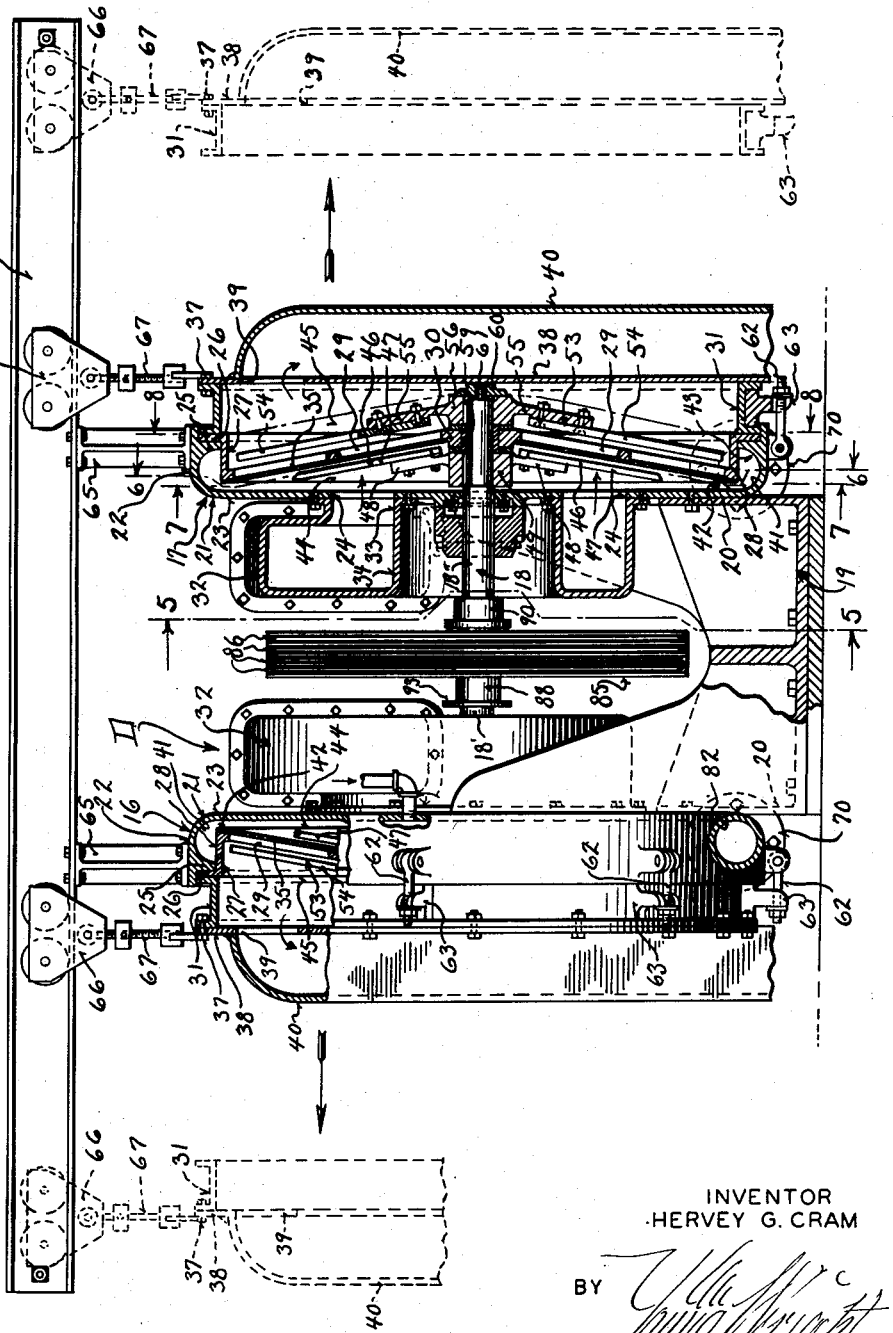
Figure 4 is a longitudinal sectional view taken on the line 4—4 of Figure 3, looking in the direction of the arrows, the view showing the novel arrangement of the screen plates, the screen plate frames and the runners.
Figure 5:
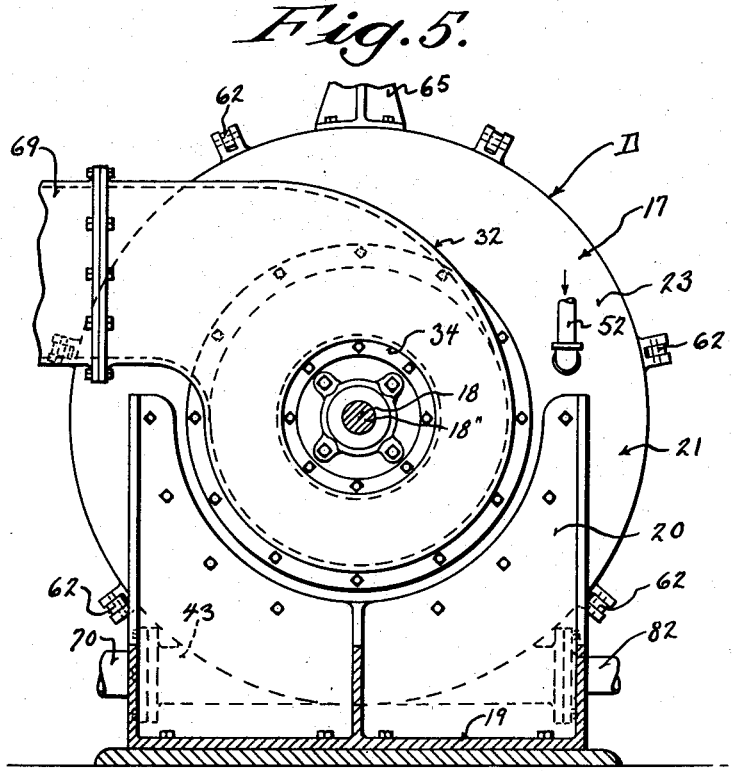
Figure 5 is a transverse sectional view taken on the line 5—5 of Figure 4, looking in the direction of the arrows, illustrating the position of the inlet housing for the unscreened pulp.
Figure 6:
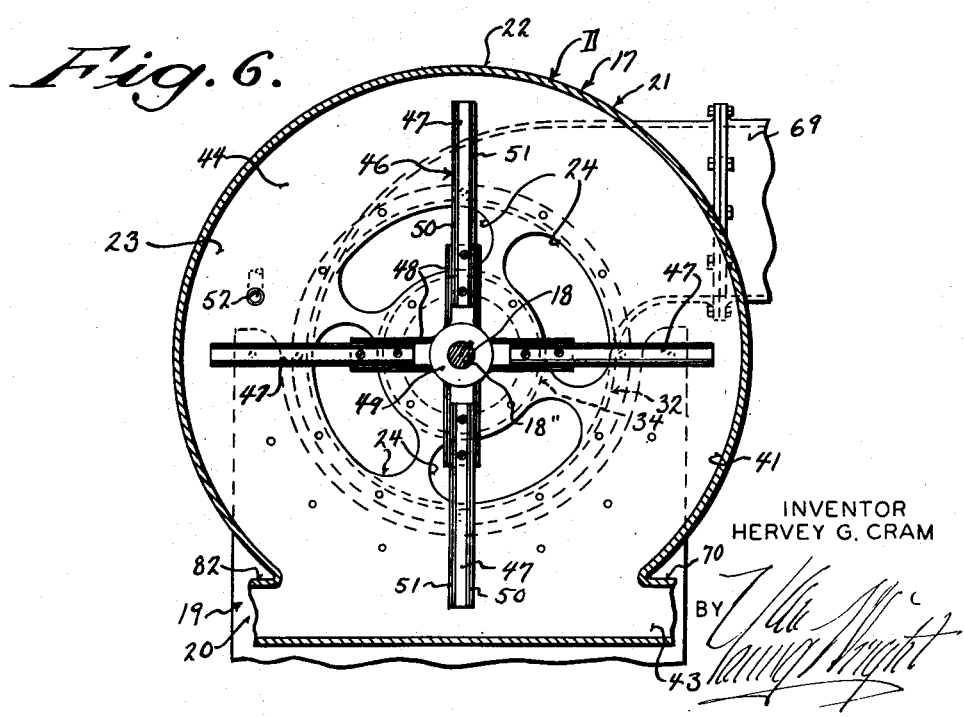
Figure 6 is a transverse sectional view taken on the line 6—6 of Figure 4, looking in the direction of the arrows, illustrating the up stream runners and the arrangement of the inlet openings for the unscreened pulp.
Figure 7:
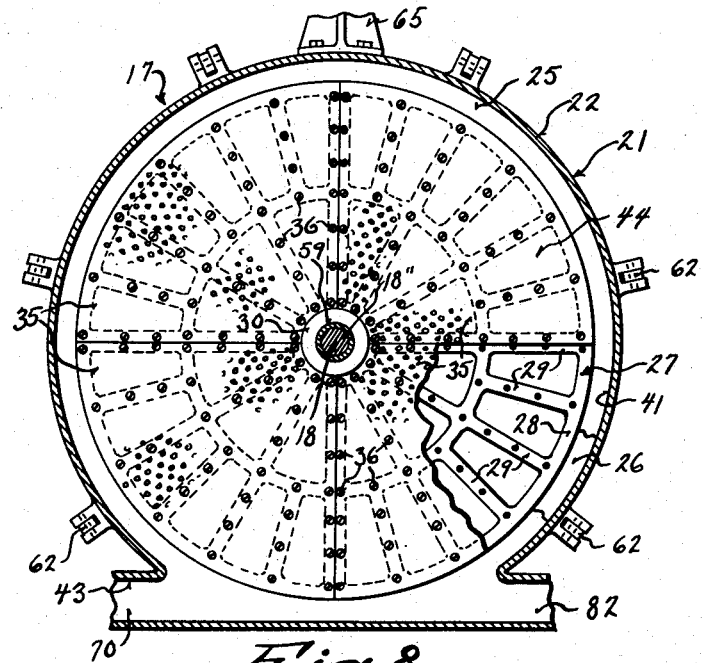
Figure 7 is a transverse section taken on the line 7—7 of Figure 4 looking in the direction of the arrows and illustrating the novel arrangement of a screen plate and its supporting frame.
Figure 8:
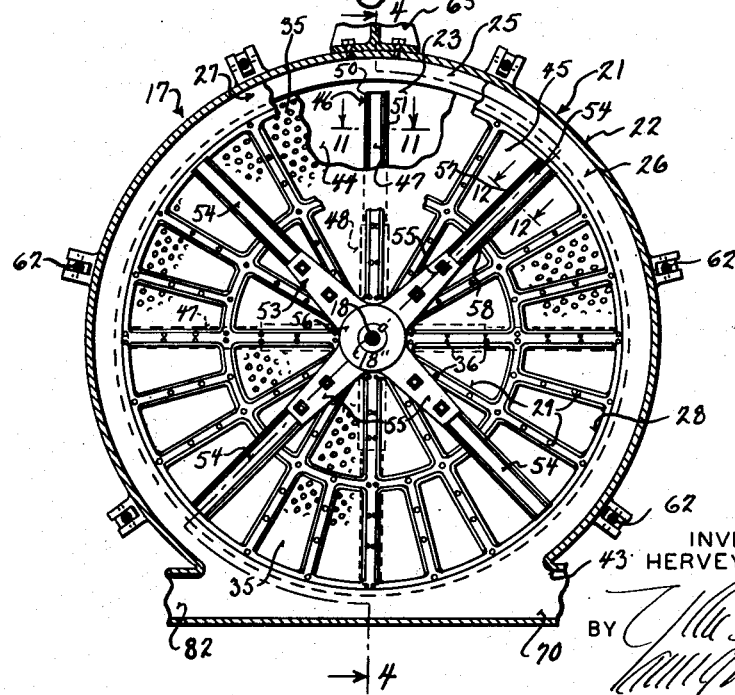
Figure 8 is a transverse sectional view taken on the line 8—8 of Figure 4 looking in the direction of the arrows illustrating the screen plate's support and the down stream runners.

As best shown in Figure 4 the rim 28 of the screen frame 27 projects into the casing 21 in spaced relation to the outer wall 22 to form an annular rejection chamber 41. The inner edge of this rim 28 also terminates short of the inner wall 23 of the casing and defines an annular inlet 42 entirely around the periphery of the screen leading to the rejection chamber 41.

Communicating with the annular rejection chamber or trough 41 is a discharge outlet 43 which will also be later referred to.

The screen plate 35 and its frame 27 divide the casing and associate parts into an inlet chamber 44 on one side thereof and an outlet chamber 45 on the other side thereof which communicates directly with the retaining clamping ring 31. Arranged within the chamber 44 are runners 46 including radially extending runner blades 47 securely fastened to arms 48 carried by a hub 49. The runner blades 47 are inclined outwardly from the hub 49 to conform to the inclination of the dished screen 35. The runners rotating past the inner face of the screen plate are so shaped as to effect a cleaning of the screen continuously and to agitate the stock, see Figure 11. By referring to Figure 11 and noting that the blade 47 is turned in a clockwise direction, then the leading inclined edge 50 of the runner blades will tend to force the stock through the screen plate. The following inclined edge 51 of the blade will tend to draw stock back through the screen plate. This gives a pulsating action which will effectively clean the screen plate from slivers and the like. The rapid rotation of the runner blades 47 will direct the incoming pulp radially and circumferentially over the screen plate. However, it is desirable to retard the radial movement in order to prevent too large a percentage of unscreened stock passing out with the rejected stock. Because the screen plate 35 slopes upstream with respect to the radially moving stock the radial outer half of the edge of each perforation in such plate will project slightly into the path of such pulp as it travels radially. This has two effects. One, it provides a back baffle tending to turn the pulp through the screen thus increasing the screen capacity. Two, it retards the rate of radial movement of the pulp. This together with the general retardation due to the uphill action slows down the rate sufficiently to decrease the percentage of unscreened pulp in the rejected pulp. While the blades 47 function in cooperation with the screen plate to maintain the solids in the unscreened pulp in suspension, there is a tendency for the pulp to thicken toward the periphery of the screen plate. Hence, white water can be introduced into the casing 21 adjacent to the periphery of the screen plate by means of an inlet white water conducting pipe 52.

Arranged within the chamber 45 and in close proximity to the down stream side of the screen plate 35 is a runner 53. This runner is similar in construction to the runner 46 and hence includes radially extending blades 54 attached to arms 55 carried by a hub 56. These blades incline inwardly and are of a substantially V-shape in cross section and include leading inclined edges 57 and following inclined edges 58, see Figure 12. The blades 54 rotate in the same direction as the blades 47 and the inclined side edges 57 and 58 thereof effect an increased flow through the screen as indicated by the arrows in Figure 12.

As heretofore intimated, one end of the common drive shaft extends through the hubs 49 and 56 of the runners 46 and 53 and the hub 30 of the screen frame 27. A bearing sleeve 59 can be placed between the shaft and the hub 30 and spacing and wear washers can be placed between the hubs 49 and 56 and the hub 30. The hubs 49 and 56 are keyed to the shaft 18 and the shaft end can be provided with a retaining plate 60 held to the shaft by a screw 61.

It is to be noted that the clamping ring 31 is held in place by hinged bolts 62 carried by the casing 21 and these bolts swing into forked ears 63 on the ring. Nuts can be threaded tight on the bolts against the ears to hold the clamping ring tight in position. The connection, however, is such that the ring is freely removable for a purpose, which will now be described.

Arranged above the disc screen D is a track or trolley beam 64. This can be an "I" beam. The trolley beam 64 is firmly secured to the casing 21 of the machines 16 and 17 by standards 65. Slidably mounted upon the trolley beam are carriages 66 and these carriages are secured to the clamping rings 31 of the machines 16 and 17. As illustrated, turnbuckle screws 67 are employed for this purpose, so that the effective height of the rings 31 relative to the casing 21 can be regulated.

By loosening the nuts on the bolts 62 and swinging the bolts outward away from the forked ears 63, the clamping ring and the discharge spout can be moved with its trolley or carriage 66 laterally of its casing 21, as illustrated in dotted lines in Figure 4. The screen frame, the screen and the runners can now be easily reached for cleaning and repair.

The unscreened pulp can be delivered to the machines 16 and 17 from a vat or box 68 (see Figure 1), by means of spouts 69 which lead directly to the inlet housings 32 of the machines 16 and 17. The pulp flows into chamber 44 through ports 24 and the accepted pulp passes through the dished screen 35 to compartment 45. The head of pulp in the chambers is maintained by the height of the discharge opening 39 and the head of pulp from the box or vat 68.

Rejections (coarse, objectionable material) unable to pass through the screen 35 are slid radially by the action of the upstream runner 46, and pass through the annular opening 42 to the rejection trough or chamber 41 and are discharged through opening 43.

The acceptable pulp flows through opening 39 and discharge spout 40 to point of use.

Communicating with the rejection outlets 43 are discharge pipes 70 connected by a cross pipe 71. This cross pipe includes valve casings 72 which communicate directly with the pipes 70 and the valve casings 72 are coupled by a T joint 73 having also communicating therewith a stand pipe 74. Connected to the stand pipe 74 at a level above the acceptable pulp discharge openings 39, is a rejection discharge pipe 75. It is to be noted that the upper end of the stand pipe 74 is open to prevent a siphoning action. Instead of the stand pipe 74 being connected to the discharge pipe 75 it may discharge directly into another portion of the box 68 and the rejected pulp be delivered to another screening machine on the same level for re-screening. Mounted in the valve casings 72, see Figures 14 and 15, are novel control valves for regulating the flow of rejection from the machines 16 and 17 to the connecting pipe 71. This valve mechanism includes a valve plate seat 76 having arcuate discharge ports 77. Movable over the seat 76 is a valve disc 78 having like arcuate ports 79. A valve stem 80 is secured to the valve disc and is rotatably mounted in the seat plate 76 and the end of the valve housing. A handle 81 is secured to the stem 80 for turning the valve disc.

In connection with the discharge of the rejected material, it is to be noted that the runner blades 47 have a definite pumping action sufficient to maintain a head on the rejection discharge over the head of the incoming unscreened pulp in the delivery tubes 69. Hence the rejected material may be delivered by gravity to another screening machine located on the same level for re-screening. For example, the rejected pulp from machine 16 may flow by gravity back to machine 17 for rescreening.

The above is important, in that, a secondary screen for re-screening the rejections may be located at the same elevation as the machines 16 and 17 without the necessity of a pump, or, the location of the re-screening machine at a lower elevation.

In order to aid the flow of rejected material out of the machine and through the pipes 71, white water inlets can be provided to the peripheral chamber or trough 41 at its lower end and white water conduit pipes 82 can communicate with these inlets.

Means is provided for flushing out the rejection pipe when necessary and communicating with the valve housing 72 of the machine 16 can be a large conduit pipe 83. Flow of material through the pipe 83 can be controlled by a hand valve 84.

Arranged intermediate the machines 16 and 17 is a common drive pulley 85, carried by the shaft 18. The pulley can be driven by belts 86 leading from a prime mover 87.

In order to facilitate the placing and removing of the belts on and off the pulley wheel 85, a novel support is provided for the pulley wheel. The shaft 18 is divided intermediate its ends (see Figure 9) into sections 18' and 18''. Feathered on shaft section 18' is a tapered sleeve 88 for movement therewith and this sleeve can be slid laterally on said shaft section 18'. The hub 89 of the pulley wheel 85 is wedged on the sleeve and is held tight on the sleeve by a hub ring 90. This hub ring 90 is keyed to shaft section 18'' and bears against a split ring 91 carried by the shaft section 18''. Cap screws 92 normally unite the hub sleeve 90 with the hub 89 of pulley wheel 85. The end of the tapered sleeve 88 from the hub sleeve 90 carries a stop plate 93.

When it is desired to remove or place belts on the pulley wheel 85 screws 92 are removed and the pulley wheel is slid laterally on the tapered sleeve 88 until the same abuts the disc 93 at which time the pulley wheel and the tapered sleeve 88 will move as a unit inwardly on shaft section 18' (see dotted lines in Figure 9). When the pulley wheel and the tapered sleeve 88 ride beyond the inner end of shaft section 18', the belts can be slid between the inner ends of shaft sections 18' and 18''.

Changes in details may be made without departing from the spirit or the scope of my invention, but what I claim as new is:

1. In a machine for screening paper stock, pulp and the like, a substantially annular casing, a drive shaft extending axially into the casing, said casing having a chamber for unscreened pulp and a chamber for accepted pulp, a dished screen between said chambers, rotatable runners keyed to said shaft for movement over the screen plate, said casing also having an annular chamber for rejections located beyond the screen plate provided with an outlet at its lower end, a housing for unscreened pulp surrounding the shaft and communicating with the chamber for unscreened pulp around said shaft, means for supplying unscreened pulp to the housing from an elevated vat, said chamber for accepted pulp having an outlet located above the inlets for unscreened pulp, means for supplying white water to the chamber for unscreened pulp adjacent to the periphery of the screen and to the rejection chamber adjacent to its outlet and means for controlling the flow of rejections through said outlet.

2. In a machine for screening paper stock, pulp and the like, a substantially annular casing, a drive shaft extending axially into the casing, said casing having a chamber for unscreened pulp and a chamber for accepted pulp, a dished screen between said chambers, rotatable runners keyed to said shaft for movement over the screen plate, said casing also having an annular chamber for rejections located beyond the screen plate provided with an outlet at its lower end, a housing for unscreened pulp surrounding the shaft and communicating with the chamber for unscreened pulp around said shaft, means for supplying unscreened pulp to the housing from an elevated vat, said chamber for accepted pulp having an outlet located above the inlets for unscreened pulp, means for supplying white water to the chamber for unscreened pulp adjacent to the periphery of the screen and to the rejection chamber adjacent to its outlet, an outlet conduit communicating with the outlet for rejections, a stand pipe communicating with said conduit and a discharge pipe communicating with the stand pipe at a point above the outlet for accepted pulp.

3. In a machine for screening paper stock, pulp and the like, a substantially annular casing, a drive shaft extending axially into the casing, said casing having a chamber for unscreened pulp and a chamber for accepted pulp, a dished screen between said chambers, rotatable runners keyed to said shaft for movement over the screen plate, said casing also having an annular chamber for rejections located beyond the screen plate provided with an outlet at its lower end, a housing for unscreened pulp surrounding the shaft and communicating with the chamber for unscreened pulp around said shaft, means for supplying unscreened pulp to the housing from an elevated vat, said chamber for accepted pulp having an outlet located above the inlets for unscreened pulp, means for supplying white water to the chamber for unscreened pulp adjacent to the periphery of the screen and to the rejection chamber adjacent to its outlet, an outlet conduit communicating with the outlet for rejections, a stand pipe communicating with said conduit, a discharge pipe communicating with the stand pipe at a point above the outlet for accepted pulp and means for controlling the flow of rejections to the stand pipe.

4. In a machine for screening paper stock, pulp and the like, a substantially annular casing, a drive shaft extending axially into the casing, said casing having a chamber for unscreened pulp and a chamber for accepted pulp, a dished screen between said chambers, rotatable runners keyed to said shaft for movement over the screen plate, said casing also having an annular chamber for rejections located beyond the screen plate provided with an outlet, a housing for unscreened pulp surrounding the shaft and communicating with the chamber for unscreened pulp around said shaft, means for supplying unscreened pulp to the housing, said chamber for accepted pulp having an outlet located above the inlets for unscreened pulp, and means for supplying diluent water to the chamber for unscreened pulp.

References Cited in the file of this patent

UNITED STATES PATENTS

| Number | Name | Date |
|---|---|---|
| 501,214 | Reinecke | July 11, 1893 |
| 733,408 | Mack | July 14, 1903 |
| 873,390 | Stevenson et al. | Dec. 10, 1907 |
| 905,374 | Sherwood | Dec. 1, 1908 |
| 1,045,476 | Vigreux | Nov. 26, 1912 |
| 1,318,053 | Davoran | Oct. 7, 1919 |
| 1,670,473 | Milne | May 22, 1928 |
| 1,679,371 | Pease | Aug. 7, 1928 |
| 1,682,099 | Soyez | Aug. 28, 1928 |
| 1,722,874 | Wells | July 30, 1929 |
| 1,795,603 | Hussey | Mar. 10, 1931 |
| 1,864,818 | Haug | June 28, 1932 |
| 1,921,750 | Heinrich et al. | Aug. 8, 1933 |
| 2,033,123 | Cowles | Mar. 10, 1936 |
| 2,371,837 | Martindale | Mar. 20, 1945 |
| 2,480,119 | Cram | Aug. 30, 1949 |
| 2,563,249 | Koziol | Aug. 7, 1951 |

FOREIGN PATENTS

| Number | Country | Date |
|---|---|---|
| 337,501 | France | Dec. 7, 1903 |
| 464,660 | France | Jan. 19, 1914 |
| 383,859 | Germany | Oct. 20, 1923 |
| 127,217 | Austria | Mar. 10, 1932 |